No. 737,311. PATENTED AUG. 25, 1903.
S. B. ALLISON.
STALK BREAKING AND FIBER CLEANING MACHINE.
APPLICATION FILED SEPT. 14, 1897. RENEWED JUNE 24, 1903.
NO MODEL.
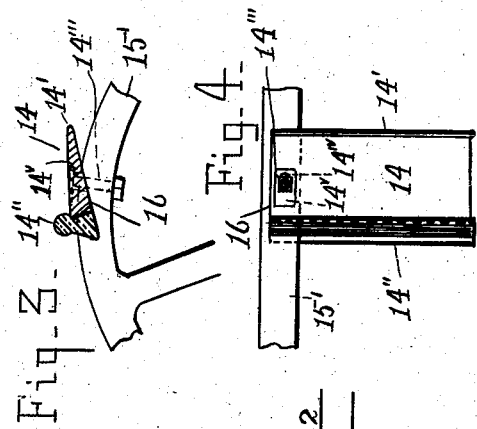
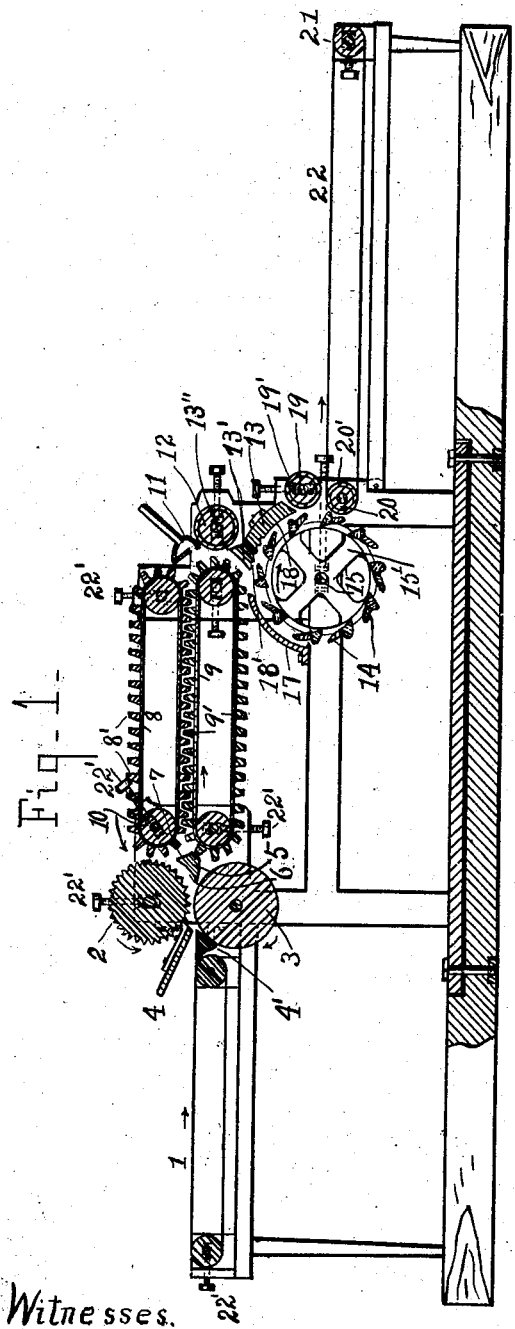
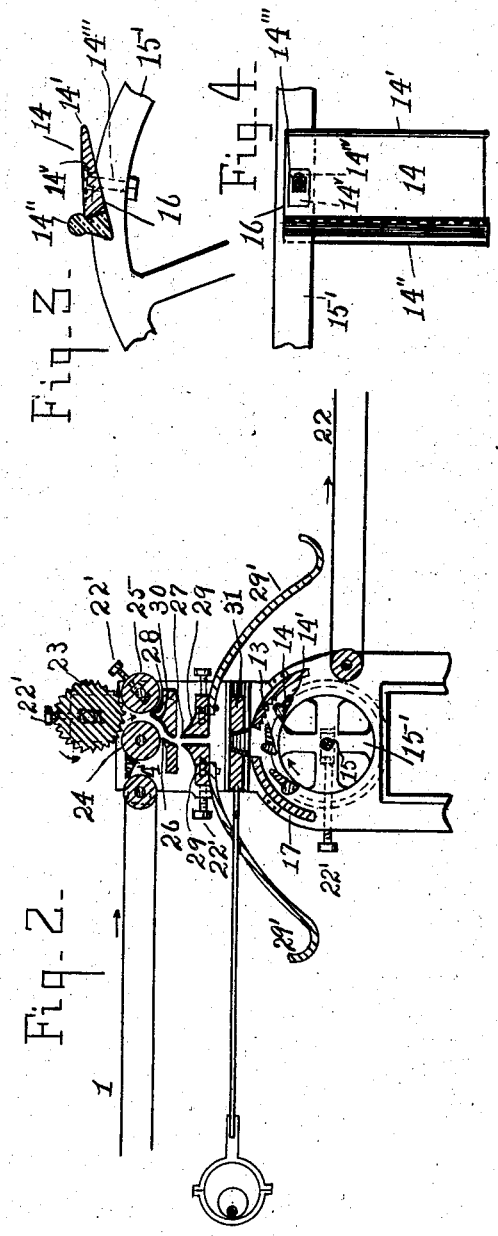
Witnesses.
C. M. Catlin
C. A. Lowell
Inventor.
Saml. B. Allison,
By Benj. R. Catlin Atty No. 737,311. Patented August 25, 1903.

UNITED STATES PATENT OFFICE.

SAMUEL BENJAMIN ALLISON, OF NEW ORLEANS, LOUISIANA; C. A. DORRESTEIN ADMINISTRATOR OF SAID ALLISON, DECEASED.

STALK-BREAKING AND FIBER-CLEANING MACHINE.

SPECIFICATION forming part of Letters Patent No. 737,311, dated August 25, 1903.

Application filed September 14, 1897. Renewed June 24, 1903. Serial No. 162,915. (No model.)

*To all whom it may concern:*

Be it known that I, SAMUEL BENJAMIN ALLISON, a resident of New Orleans, in the parish of Orleans and State of Louisiana, have invented certain new and useful Improvements in Stalk-Breaking and Fiber-Cleaning Machines; and I do hereby declare the following to be a full, clear, and exact description of the invention, such as will enable others skilled in the art to which it pertains to make and use the same.

The invention relates to machines for separating the fibrous and woody portions of freshly-cut or green stalks of ramie, hemp, and other like plants, and has for its object to increase their efficiency without unduly increasing their cost and the complexity of their parts.

The invention consists in the construction hereinafter described and particularly pointed out.

In the accompanying drawings, Figure 1 is a central section taken longitudinally through the charging and discharging devices and transverse to the breaking and scutching devices. Fig. 2 is a similar view of a modified machine. Figs. 3 and 4 are an enlarged section and broken plan, respectively, of a scutching-blade and rubbing-bar.

Numeral 1 denotes an endless belt to feed stalks, leaves, or plants between the circumferentially-grooved stalk-splitting roller 2 and its coacting smooth-surfaced roller 3.

4 denotes a guide-board for the material, and 4' a scraper for roller 3.

5 denotes a block having a scraping edge for roller 3 and having a working bed 6 coöperating with roller 2 and a bed 7 coöperating with the blades 8' of an endless openwork belt or series of belts 8. The upper edge of the guide or block 5 extends slightly above the overlapping edges of stalk-rubbing bars to be described. An open-work belt or series of parallel belts is indicated by 9, and 9' denotes blades which mesh loosely with blades 8' and in manner to break wood fragments, and while they also rub the material they draw it forward, separating the broken wood in the operation. This separated refuse drops between the bars and out of the machine, so that it does not interfere with the subsequent treatment of the fiber. To secure the best results, the belts may have a speed greater than that of the roller, and a ratio of six or seven to one has been found suitable.

The bearing 10 of an upper belt-roller is set obliquely and made adjustable by wellknown blocks and by set-screws 22' to provide that the distance between the blades 8' and 9' may be varied in an oblique direction and also that the blades 8' may be adjusted to the bed 7.

11 denotes a guide which may be made hollow and have a supply-pipe and which may be perforated to discharge liquid upon the material as it is turned down between roller 12 and the bars 9' of the lower endless belt.

13 denotes a block having a working bed 13' coöperating with bars 9' after they have beaten the material against roller 12, and it also has a bed coöperating with the scutching-bars 14. The situation of the belts 8 and 9, with their scutching-bars, is such that they are adapted to separate broken woody refuse and discharge it out of the path of the fiber before the latter reaches the sprinkler and before it is subjected to the action of roller 12 and other devices to be described. 13" denotes a scraping edge to clear said roller 12, and 17 is a cover for the roller below. Block 13 is suitably formed on its under side to provide a working bed 18 for the devices carried by the subjacent roller. This bed may be corrugated, as indicated at its upper part at 18'.

15 denotes the axis of a roller having heads 15', which may be of disk form, or preferably of spider form, provided with a rim for the attachment of scutching or scraping bars 14. These have edges 14', forwardly inclined and moving near the bed 18 to strike and rub the nearly-cleaned fiber up against this overhanging bed, which may be corrugated more or less, as desired. The bars 14 are removably fixed in suitable seats 16, (see Figs. 3 and 4,) situated in the heads of the roller. 14" denotes elastic buffing or rubbing bars, situated immediately behind bars 14 and extending a little outside of the path of edges 14'. They may be made of rubber of medium softness or of other durable and elastic material adapted to give a final smooth rubbing action on the fiber to wipe off the fine woody refuse and lint. This refuse, beaten out by these bars and rubbed off from the fiber by the rubbing-buffers 14'', can fall between the said bars and out of the path of the fiber, which is seized by the rollers 19 and 20, having, if desired, elastic coverings 19' and 20', and carried away by the endless belt 22, run upon rollers 20 and 21.

The devices last described are shown in Fig. 2 in a modified combination. In said figure a crushing-roller is indicated by 23, and a smooth-surfaced coöperating roller is denoted by 24. The roller 25 has a smooth surface and serves to deflect the material downwardly and also presses the broken stalks against roller 24. A scraper is denoted by 26 and a working bed coöperating with roller 24 by 27. This bed terminates in a scraping edge 28. Adjustable sliver cleaning and gripping plates are denoted by 29. These are adapted by their edges 30 to separate refuse from the fiber.

29 are chutes to carry the refuse away from the cleaning devices. The plates also hold the sliver against the transverse action of reciprocating cleaning-blades 31 in case such are used. These devices deliver the partially-cleaned fiber separated from much of the refuse to devices similar to those described in connection with Fig. 1. All the bearings have, preferably, rubber blocks or springs back of the usual brasses, and 22' denotes in every figure screws with handles for adjusting the spring-pressure and varying the distance between the faces of rollers and other devices acting on the fiber. The rubber bars 14'', situated behind the bars 14, may be used to support the said bars in a yielding manner, and the bolts 14''' in such case will pass through oblong slots 14' in the bars to permit them to yield slightly to pressure on the working or free edges caused by their striking the material against the bed 18 or against its ribs 18'. The rubber parts 14'' may also yield slightly in a radial direction under the pressure caused by their action upon the fiber held against the bed 18. These buffing or rubbing parts 14'' may in some cases be made of fibrous elastic material or of compressible material, such as leather.

16 denotes seats formed in the roller-heads. These are preferably undercut on one side to receive the enlarged foot of the elastic bars 14'', and said bars have each a head which overhangs the rear of a bar 14, by which it is provided that the bolts hold both bars in the seats.

The construction is specially adapted to the final treatment of the fiber and permits a close and nicely-adjusted beating and rubbing action very suitable for removing the residue of fine refuse without injury to the material.

As illustrated in Figs. 3 and 4, the scutching-bars 14 and the elastic rubbing-bars 14'' are held in place by a single detachable screw-bolt having a head or nut seated in a depression 14$^v$. These bars can be removed in whole or in part to permit the substitution of other devices, if desirable.

It is one of the purposes of the improvement to separate and discharge the broken wood and other refuse at as early a stage in the operation as practicable, and for this purpose special means have been devised. The situation and construction of the endless belts and their bars provides that much refuse will be discharged before the skeleton roller and its blades operate on the fiber, and the construction of this roller and scutching and rubbing bars and their situation underneath the bed insures that the residue of refuse separated thereby can drop freely out of the path of the cleaned fiber.

I am aware that stalk-flattening rollers having a smooth surface have been combined with endless belts carrying stalk bending and breaking bars, and such combination is not of my invention, which is characterized by devices for first breaking stalks transversely and then closely rubbing or scraping the broken stalks to separate wood, the construction being such that the separated wood is discharged immediately from the machine. This discharge of wood precedes the action of the scutching devices.

Having described my invention, what I claim is—

1. The combination of devices for breaking stalks transversely, wood-separating mechanism having devices for breaking and rubbing the material to thereby deliver the wood from the machine, means for guiding the broken stalks from the breaking devices to the wood-separating mechanism, mechanism to scutch the partially-cleaned fiber, and means for guiding the partially-cleaned fiber from the wood-separating mechanism to the scutching mechanism.

2. The combination of devices for breaking stalks transversely, wood-separating mechanism adapted to deliver the wood from the machine before the scutching operation, mechanism to scutch the partially-cleaned fiber, a guide for the broken stalks from the breaking devices to the wood-separating mechanism, said guide coöperating with a part of the breaking mechanism to loosen the broken wood, and means for guiding the partially-cleaned fiber from the wood-separating mechanism to the scutching mechanism, said scutching mechanism comprising an open-work roller coöperating with a bed situated above it.

3. The combination of the rollers 2 and 3, one of said rollers having longitudinal corrugations to break the stalks transversely, the guide 5 for the broken stalks, the belts provided with wood-separating bars, said guide having a working face extending above the overlapping edges of said bars, the guide-roller 12 situated adjacent the path of the bars of one of the belts, the block 13 having two working beds, and the scutching-roller 15, said beds of the block coöperating with a belt and with the roller 15 respectively.

4. The combination of means for transversely breaking stalks, belts provided with wood-separating bars, guide-roller 12, and block 13, said block having working beds coöperating with a belt and with the roller 15 respectively, and the roller and guide being situated adjacent the end of one of the belts and coöperating with its bars to clean the fiber and guide it about the end of the belt.

5. In a machine for separating the wood and fiber of plants, a working bed adjacent the path of the material, a roller, scutching-blades secured in said roller in a plane approximately tangential to its circumference, an elastic backing situated behind the blade and opposite its working edge, said bed being curved similarly to the path of said edge, and means to drive the several parts of the machine including mechanism to rotate the roller and carry the edge of the scutching-blade obliquely against material between it and the bed, substantially as described.

6. In a machine for separating the wood and fiber of plants, a roller having sockets or seats 16, the bars 14 held in said seats, and elastic rubbing-bars 14'' situated in said seats back of the bars, substantially as described.

7. In a fiber-cleaning device, a roller having sockets or seats 16, the bars 14, elastic rubbing-bars 14'' back of said bars 14, and the bolts 14''' securing both bars removably in the seats, substantially as described.

8. In a fiber-cleaning device, a roller having sockets or seats 16, the bars 14, elastic rubbing-bars 14'' back of said bars 14, and the bolts 14''' securing both bars removably in the seats, the bars having enlarged openings to permit them to yield under blows and compress the rubbing-bars, substantially as described.

9. In a fiber-cleaning device, a roller having sockets or seats 16, the bars 14, elastic rubbing-bars 14'' back of said bars 14, said bars 14'' each having an enlarged foot to engage an undercut wall of its seat and also a rubbing-head overhanging the bar 14, substantially as described.

10. In a machine for separating the wood and fiber of plants, coöperating endless belts each provided with fiber-rubbing bars, the bars of one belt meshing with those of the other, rollers to drive the belts, and means for adjusting the bearings of one of said rollers in a direction oblique to the path of the main portions of the belts, to both tighten a belt and move it nearer the other belt, substantially as described.

In testimony whereof I have signed this specification in the presence of two subscribing witnesses.

SAMUEL BENJAMIN ALLISON.

Witnesses:
ED. G. DEL CORRAL,
OTTO H. OERTLING.